Patented Nov. 29, 1938

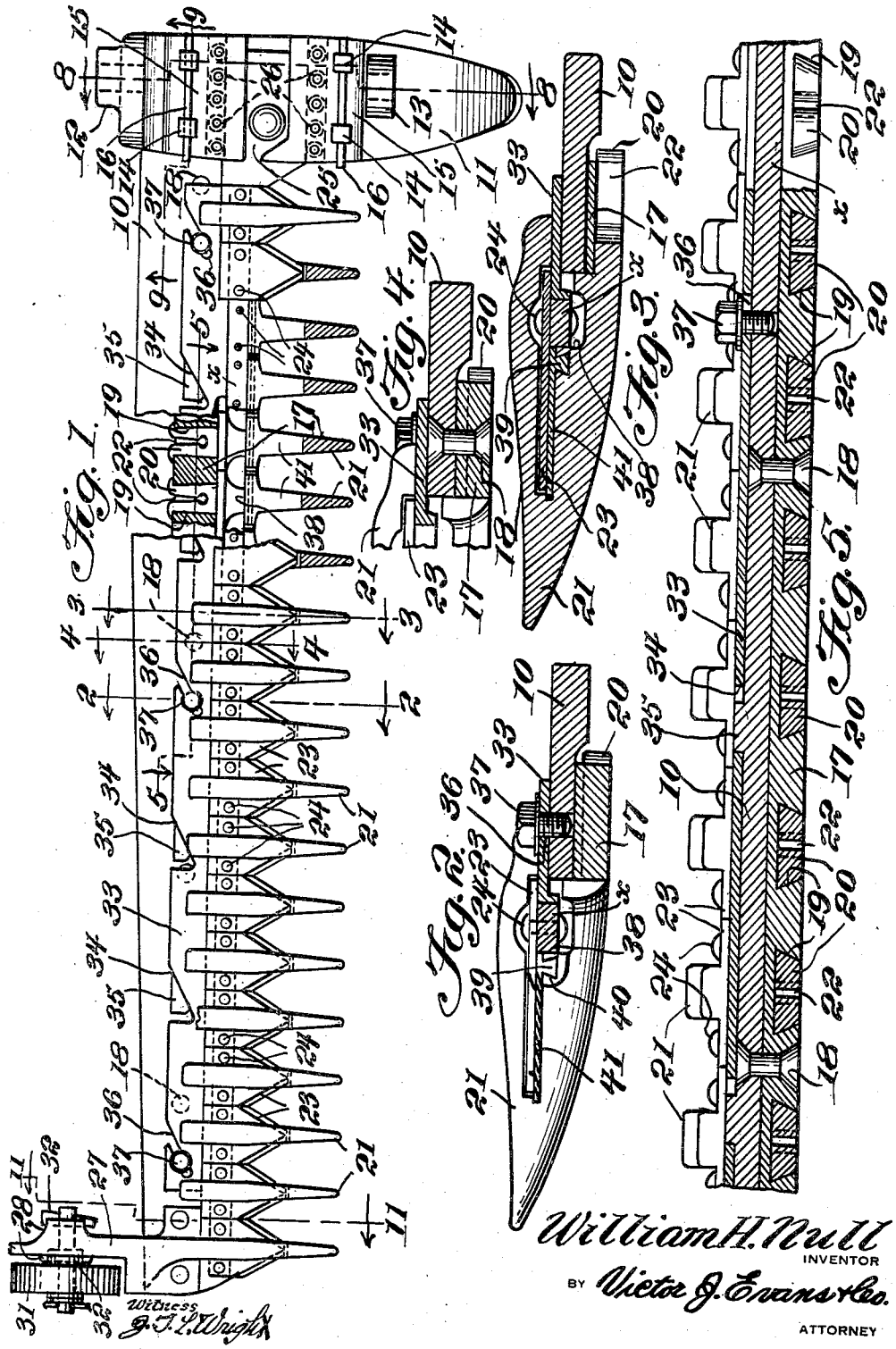

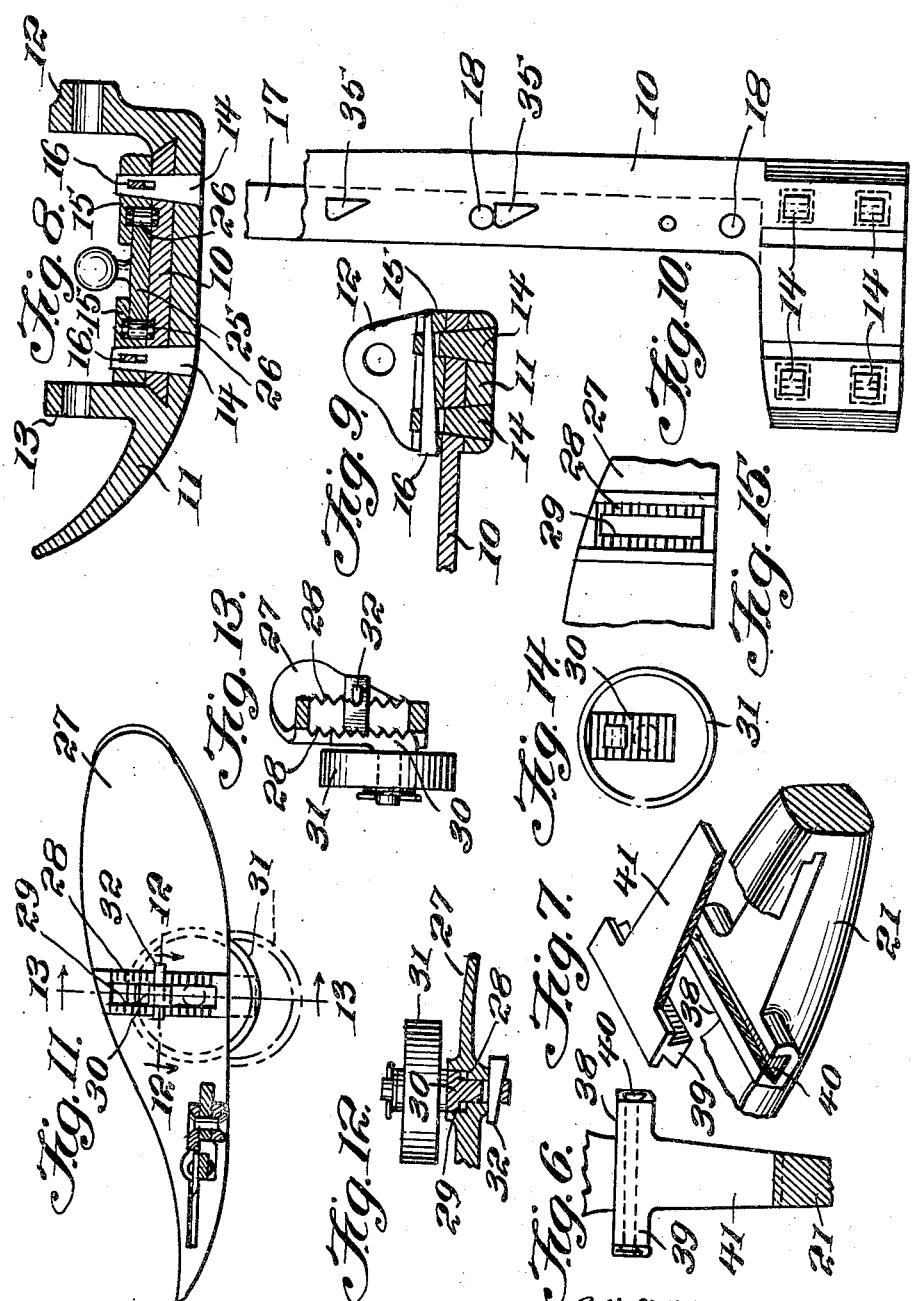

2,138,305

UNITED STATES PATENT OFFICE 2,138,305

SICKLE BAR FOR REAPERS AND MOWERS

William H. Null, Liberty, W. Va., assignor of one-half to George Null, Liberty, W. Va.

Application September 28, 1936, Serial No. 102,996

1 Claim. (Cl. 56—298)

The invention relates to a sickle bar assembly and more especially to sickle bars for reapers and mowers.

The primary object of the invention is the provision of a sickle bar assembly of this character, wherein the parts are held together without the use of bolts or nuts and the knife guards are fastened in place in a novel manner so that in event of breakage the said guards can be replaced with dispatch and when fastened will be firm and secure.

Another object of the invention is the provision of an assembly of this character, wherein the hold-down clips ordinarily employed will be entirely dispensed with and in substitute an adjustable retaining plate is utilized and fastened in place in a novel manner.

A further object of the invention is the provision of an assembly of this character, wherein the sickle bar wheel is adjustably secured and held against release through the medium of a key so that there is no chance of the loss of the wheel in the use of the sickle bar assembly.

A still further object of the invention is the provision of an assembly of this character, wherein the grass board shoe is fastened in place in a novel manner, that is to say, by the use of wedging keys, the assembly in its entirety being of novel construction.

A still further object of the invention is the provision of an assembly of this character, which is comparatively simple in construction, thoroughly reliable and efficient in its operation, readily and easily set up, strong, durable, and inexpensive to manufacture and install in a reaper or mowing machine.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a sickle bar assembly constructed in accordance with the invention and partly broken away.

Figure 2 is a sectional view on the line 2—2 of Figure 1 looking in the direction of the arrows.

Figure 3 is a sectional view on the line 3—3 of Figure 1 looking in the direction of the arrows.

Figure 4 is a fragmentary sectional view on the line 4—4 of Figure 1 looking in the direction of the arrows.

Figure 5 is a sectional view on the line 5—5 of Figure 1 looking in the direction of the arrows.

Figure 6 is a horizontal sectional view through one of the knife guards.

Figure 7 is an exploded fragmentary perspective view of one of the knife guards showing a wear plate separated therefrom.

Figure 8 is a sectional view on the line 8—8 of Figure 1 looking in the direction of the arrows.

Figure 9 is a sectional view on the line 9—9 of Figure 1 looking in the direction of the arrows.

Figure 10 is a fragmentary plan view of the grass board and its shoe.

Figure 11 is a sectional view on the line 11—11 of Figure 1 looking in the direction of the arrows.

Figure 12 is a sectional view on the line 12—12 of Figure 11.

Figure 13 is a sectional view on the line 13—13 of Figure 11.

Figure 14 is an elevation of the wheel hanger for the sickle bar.

Figure 15 is a fragmentary inner elevation of the wheel shoe.

Similar reference characters indicate corresponding parts throughout the several views in the drawings.

Referring to the drawings in detail, the sickle bar assembly includes a grass board 10 which at one end carries the grass board shoe 11 which has the bearings 12 and 13, respectively, upstanding therefrom for pivotal connection of the sickle bar with the reaper or mowing machine or the like. This shoe 11 carries wedge lugs 14 which pass through suitable openings therefor in the grass board 10 and in guide cleats 15 and accommodate wedging keys 16 which fasten these parts together.

The grass board at its under side has riveted thereto a wheel plate 17, the rivets therefor being indicated at 18 while formed in this wheel plate 17 crosswise thereof are dovetailed shaped grooves 19 for accommodating correspondingly shaped extensions 20 of blade guards 21, the extensions being bifurcated at 22 so that they can be spread for clenching purposes within the grooves 19 and in this manner the guards 21 are fastened in their spaced order throughout the longitudinal extent of the sickle bar without the use of bolts, nuts or the like.

Slidable through the guards is the knife bar $x$ having the knives 23 of standard construction riveted at 24 thereto, the bar at the end 25 thereof engages with anti-friction rollers 26 as mounted within the grass board 10 in association with the cleats 15.

At the other end of the grass board is a wheel shoe 27, it having a slotted inside and outside rack formation 28, the slot 29 thereof accommodating a wheel bracket 30 carrying a ground wheel 31, the bracket being adapted to accommodate a locking key 32 which engages with the rack formation to hold the bracket in vertically adjusted position on the shoe 27.

Carried by the grass board at the top thereof is an adjustable retaining plate 33, it having the triangular shaped notches 34 coacting with triangular shaped lugs 35 on the grass board and also the diagonally disposed slots 36 formed in said plate 33, these slots accommodating guide bolts 37 threaded in the grass board 10 and in this manner the plate 33 is adjusted to retain the cutter bar in its guideway 38 as provided in the guards 21, the cutter bar being reciprocated in the usual manner.

The guards through tongue and groove connections 39 and 40, respectively, carry wear pieces 41 for the cutter bar with the knives 23, the tongues 39 being formed on the pieces 41 while the grooves 40 are formed in the lower portions of the guards 21.

It will be apparent from Figures 1 to 8 of the drawings that the sickle bar is devoid of bolt and nut fasteners in the assembly of the parts thereof and that the guards 21 are readily and easily attached and detached as the occasion may require. The wheel shoe 27 is riveted or otherwise similarly attached to the grass board 10 while the grass board shoe 11 is wedge keyed to the said board.

What is claimed is:

In a sickle bar assembly, a supporting bar, a knife bar movable relative thereto, substantially triangular shaped lugs projecting from the supporting bar, an adjustable retaining plate on the supporting bar for the knife bar and having notches correspondingly shaped to the lugs for receiving the same and also provided with diagonally disposed slots, and guide bolts engaged in the supporting bar and received in the said slots for the fastening of the retaining plate in adjusted position.

WILLIAM H. NULL.